United States Patent
Aliakbarzadeh

(10) Patent No.: US 8,103,430 B2
(45) Date of Patent: Jan. 24, 2012

(54) METHOD AND DEVICE FOR THE DIAGNOSIS OF THE CYLINDER-SELECTIVE UNEVEN DISTRIBUTION OF A FUEL-AIR MIXTURE FED TO THE CYLINDERS OF AN INTERNAL COMBUSTION ENGINE

(75) Inventor: Reza Aliakbarzadeh, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 352 days.

(21) Appl. No.: 12/302,604

(22) PCT Filed: May 21, 2007

(86) PCT No.: PCT/EP2007/054896
§ 371 (c)(1),
(2), (4) Date: Jul. 7, 2009

(87) PCT Pub. No.: WO2008/009499
PCT Pub. Date: Jan. 24, 2008

(65) Prior Publication Data
US 2010/0286892 A1 Nov. 11, 2010

(30) Foreign Application Priority Data
Jul. 21, 2006 (DE) .......................... 10 2006 033 869

(51) Int. Cl.
*F02D 41/14* (2006.01)
(52) U.S. Cl. ........ 701/109; 701/104; 123/673; 123/674; 123/690; 123/479
(58) Field of Classification Search .................. 701/103, 701/104, 109; 123/673, 674, 690, 479
See application file for complete search history.

(56) References Cited

U.S. PATENT DOCUMENTS

| | | | |
|---|---|---|---|
| 5,020,502 A | 6/1991 | Wild | 123/489 |
| 5,623,913 A * | 4/1997 | Kitajima et al. | 123/673 |
| 5,694,910 A * | 12/1997 | Hasegawa | 123/674 |

(Continued)

FOREIGN PATENT DOCUMENTS
DE 19720009 11/1998
(Continued)

OTHER PUBLICATIONS
International Search Report and Written Opinion; PCT/EP2007/054896; pp. 10, Aug. 24, 2007.
(Continued)

*Primary Examiner* — Erick Solis
(74) *Attorney, Agent, or Firm* — King & Spalding L.L.P.

(57) ABSTRACT

With an internal combustion engine (1) there is the problem that the fuel-air mixture directed into the combustion chamber of the cylinders (2) can be substantially influenced by manufacturing tolerances and ageing of the fuel injectors and uneven distribution is thus created. The uneven distribution is individually determined for each cylinder (2) depending on the operating mode of the internal combustion engine (1) (homogenous operation, stratified operation), wherein either the exhaust gas is analyzed and a corresponding emission value is determined therefrom or that a value is individually determined for each cylinder (2) for the operational roughness of the internal combustion engine (1). These values are compared with a limit value predetermined for the internal combustion engine (1) and upon exceeding of the predetermined limit value a fault entry in a fault memory (9) is made for the cylinder (2) concerned.

16 Claims, 4 Drawing Sheets

U.S. PATENT DOCUMENTS

| | | | |
|---|---|---|---|
| 5,911,682 A * | 6/1999 | Kato et al. | 60/276 |
| 5,947,096 A * | 9/1999 | Kurokawa et al. | 123/673 |
| 7,284,545 B2 * | 10/2007 | Rosel et al. | 123/673 |
| 7,319,930 B2 | 1/2008 | Dietl et al. | 701/104 |
| 7,320,309 B2 | 1/2008 | Michalske et al. | 123/443 |
| 7,603,994 B2 * | 10/2009 | Ueda | 123/673 |
| 2007/0062504 A1 | 3/2007 | Michalske et al. | 123/679 |
| 2007/0162215 A1 | 7/2007 | Dietl et al. | 701/103 |
| 2007/0240695 A1 * | 10/2007 | Mitsuda et al. | 123/673 |
| 2009/0198434 A1 * | 8/2009 | Tanaka et al. | 701/103 |

FOREIGN PATENT DOCUMENTS

| | | |
|---|---|---|
| DE | 102 59 846 B3 | 6/2004 |
| DE | 103 31 159 A1 | 1/2005 |
| DE | 103 39 251 A1 | 3/2005 |
| DE | 10338775 | 3/2005 |
| DE | 10 2005 005 765 A1 | 8/2006 |
| JP | 63155787 A | 6/1988 |
| JP | 2005736 A | 1/1990 |
| JP | 7317586 A | 12/1995 |
| JP | 2004330205 A | 11/2004 |
| JP | 2005180291 A | 7/2005 |
| JP | 2006138280 A | 6/2006 |
| WO | WO 89/06310 A1 | 7/1989 |
| WO | 9635048 | 11/1996 |
| WO | 2005075806 | 8/2005 |

OTHER PUBLICATIONS

Japanese Office Action, Japan application No. 2009-513639, 10 pages, Jun. 10, 2010.

* cited by examiner

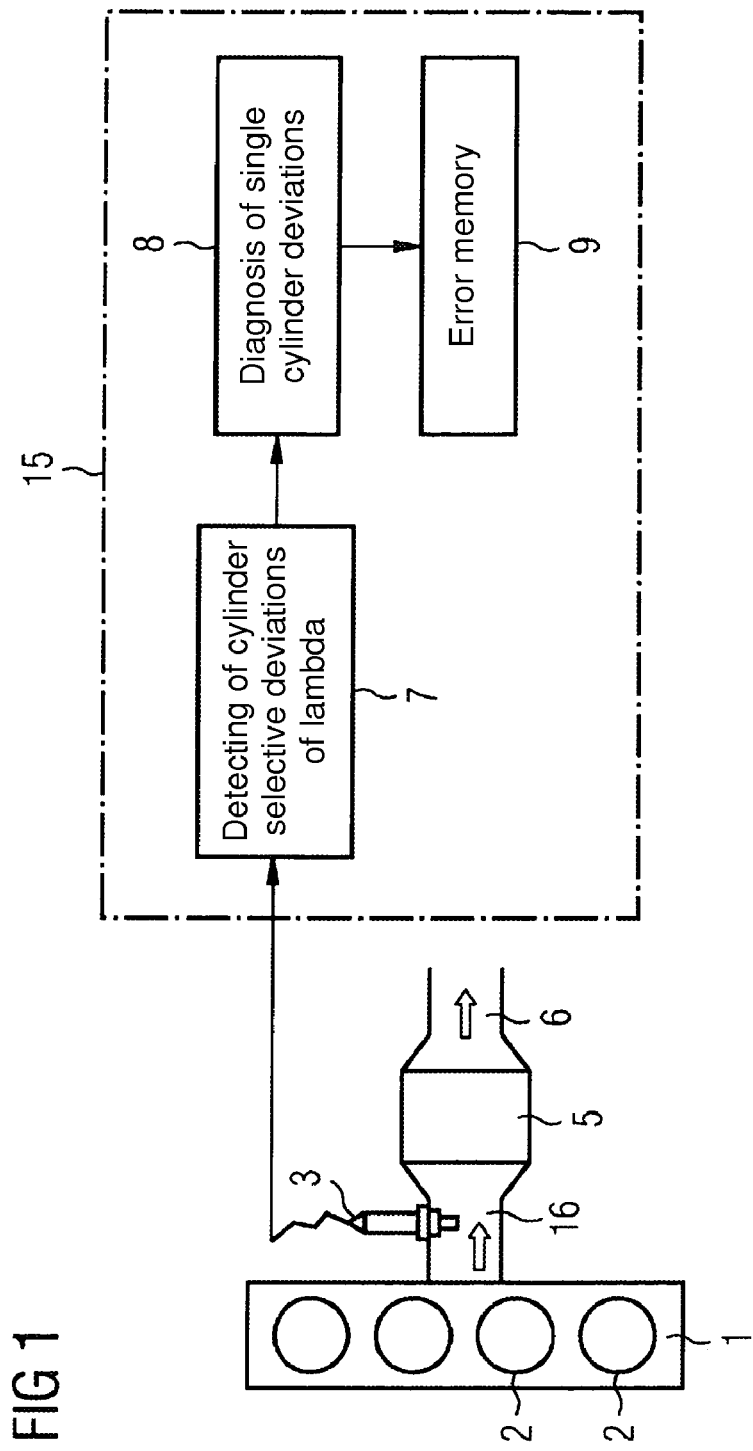

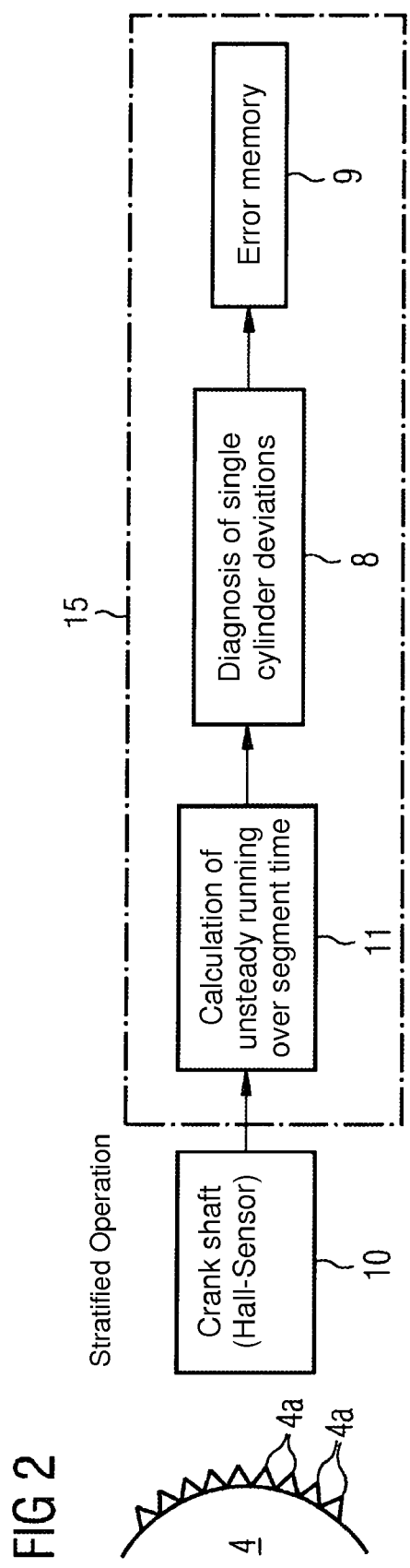

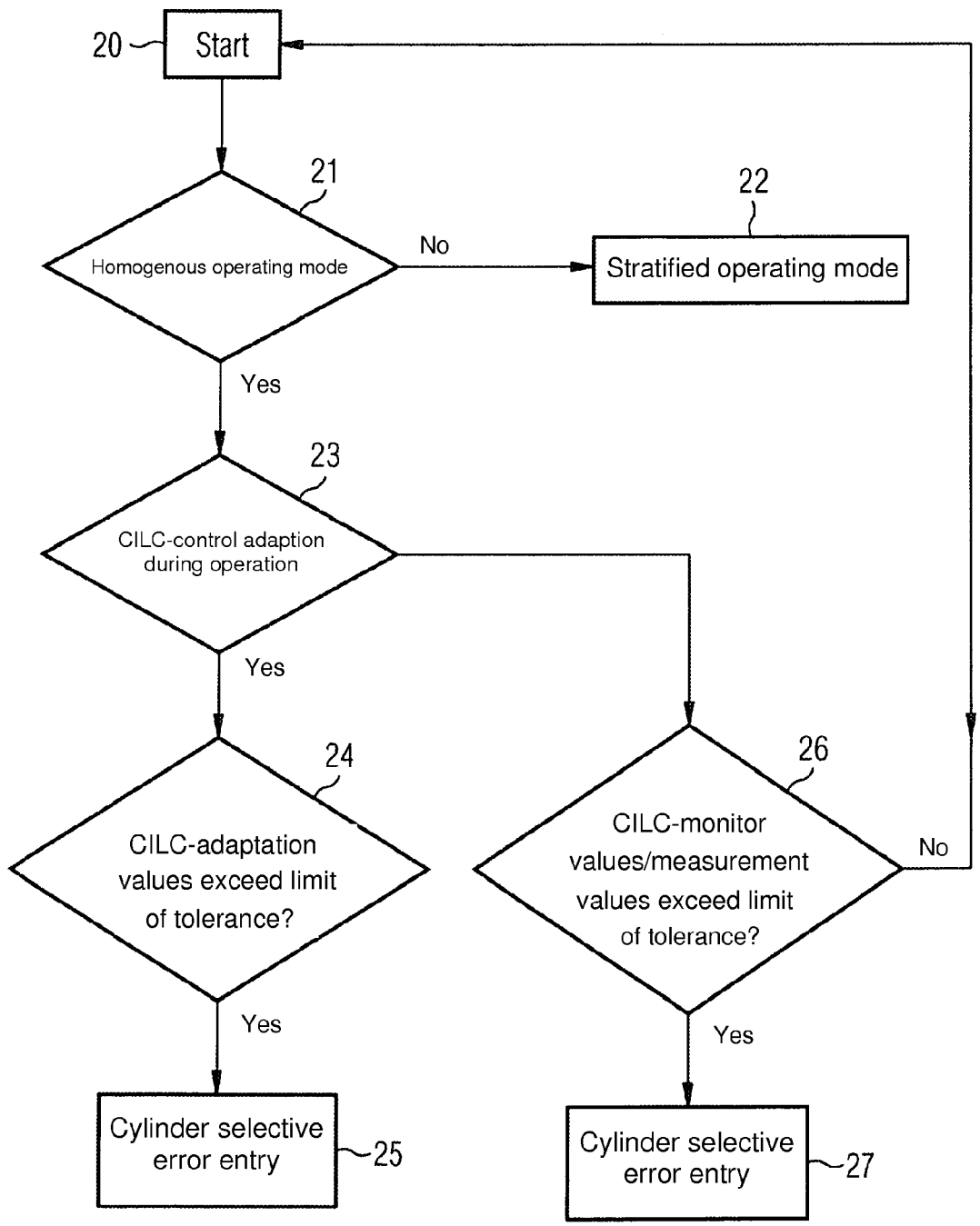

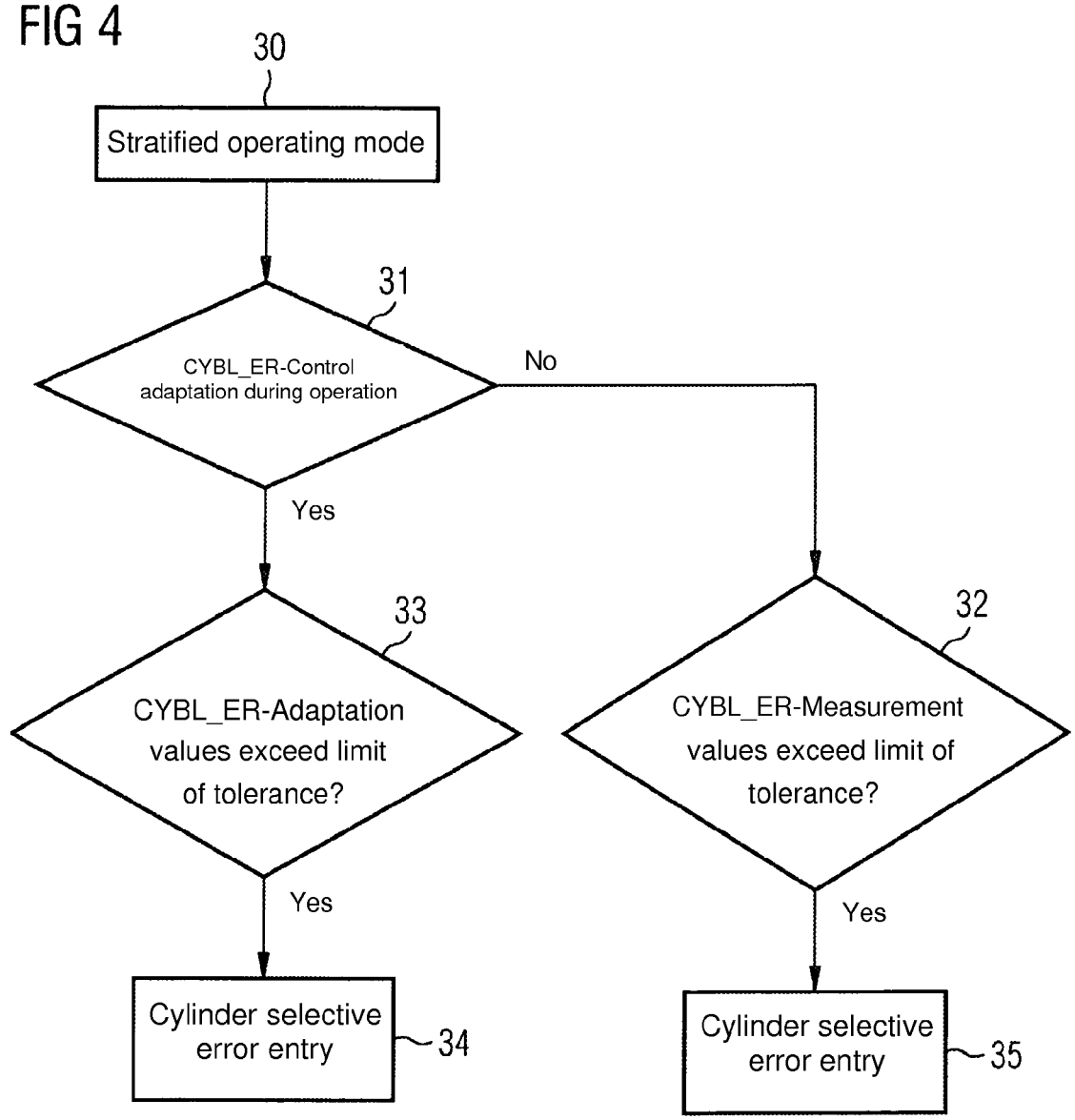

METHOD AND DEVICE FOR THE DIAGNOSIS OF THE CYLINDER-SELECTIVE UNEVEN DISTRIBUTION OF A FUEL-AIR MIXTURE FED TO THE CYLINDERS OF AN INTERNAL COMBUSTION ENGINE

CROSS-REFERENCE TO RELATED APPLICATIONS

This application is a U.S. National Stage Application of International Application No. PCT/EP2007/054896 filed May 21, 2007, which designates the United States of America, and claims priority to German Application No. 10 2006 033 869.3 filed Jul. 21, 2006, the contents of which are hereby incorporated by reference in their entirety.

TECHNICAL FIELD

The invention relates to a method and a device for the diagnosis of the uneven distribution of a fuel-air mixture fed to the individual cylinders of an internal combustion engine embodied with a plurality of cylinders.

BACKGROUND

Stricter legal requirements demand lower emission limit values for the exhaust gas of a motor vehicle for future vehicle models. It is already known that with internal combustion engines, which for example comprise four or more cylinders, the injected fuel quantity and thus the fuel-air ratio formed can differ between the individual cylinders. This is substantially due to the injection valves used, more preferably such as are controlled by a piezoelectric actuator, have differing manufacturing tolerances and are also subject to greater ageing influences.

It is furthermore known that with Otto-cycle engines a so-called lambda probe is used to determine the exhaust gas composition. The lambda probe is generally installed in the exhaust pipe near the engine and in front of the catalytic converter. The lambda probe is used to determine the residual oxygen proportion in the exhaust gas. Depending on the amount of the residual oxygen proportion more or less fuel is injected in the cylinders of the internal combustion engine or a corresponding control valve for returning the exhaust gas into the combustion chamber controlled. In this manner merely an average exhaust gas value can be set for the internal combustion engine, but not for an individual cylinder.

A further problem also consists in that the volume of an exhaust gas bank is relatively low because of the small distance between the individual cylinders as far as the catalytic converter and a smaller mixing distance for the exhaust gas is thus obtained than with an arrangement of the catalytic converter far away from the engine. Because of this, the influence of unevenness in the feeding of the fuel-air mixture to the individual cylinders is particularly pronounced.

Furthermore it is known that a fuel diagnosis (FSD, Fuel System Diagnosis) is conducted on the basis of an adaptation value determined by a lambda controller. With this method for example the adaptation value of each exhaust gas bank is monitored. If the adaptation value exceeds a predefined limit over a certain period of time a fault is entered for the exhaust gas bank concerned. However, the fault message merely shows that a fuel or air fault is present in the exhaust gas bank concerned. The actual cause of the determined deviation cannot be located however. A defective fuel injector for example would trigger a fault entry but it would not be possible to clearly detect the injector itself as source of the fault.

In the USA it is additionally demanded by law for the next vehicle generations that will come on to the market that the uneven distribution in the fuel-air ratio is to be individually detected for each cylinder. However, a practical solution for the cylinder-selective uneven distribution in the fuel-air ratio that can be applied to coming vehicle generations has not become known as yet.

SUMMARY

According to various embodiments, the diagnosis of the uneven distribution of a fuel-air ratio in an internal combustion engine can be improved with respect to the exhaust emissions.

According to an embodiment, a method for the diagnosis of the uneven distribution of a fuel-air mixture fed to the individual cylinders of an internal combustion engine embodied with a plurality of cylinders, may comprise the steps of: supplying the air via a throttle flap and the fuel for each cylinder via an injection valve and wherein following the combustion of the fuel-air mixture, sensing a lambda value of the created exhaust gas, wherein the uneven distribution for each cylinder is individually determined depending on the operating mode of the internal combustion engine by determining a lambda value or an operational roughness of the internal combustion engine, the values individually determined for the individual cylinders are compared with a limit value predetermined for the internal combustion engine, upon exceeding of the predetermined limit value for the cylinder concerned a fault entry is made in a fault memory, upon exceeding of the predetermined limit value the fuel quantity to be injected for the cylinder concerned is corrected so that the predetermined limit value is maintained with a subsequent injection, and with unsuccessful correction of the cylinder concerned the fuel supply to the cylinder concerned is limited to a maximum or a minimum value.

According to a further embodiment, with an internal combustion engine operating in homogenous mode a lambda value can be determined and output. According to a further embodiment, with an internal combustion engine operating in stratified mode the operational roughness of the internal combustion engine can be analyzed and a corresponding value is output. According to a further embodiment, the operational roughness can be determined through measurement of a segment time on a crankshaft of the internal combustion engine. According to a further embodiment, with repeated unsuccessful correction of the cylinder concerned at least one of a visual and acoustic fault message can be output.

According to another embodiment, a device for diagnosing the uneven distribution of a fuel-air mixture with an internal combustion engine may comprise a throttle flap which is arranged in an intake tract, a controllable injection valve, an exhaust gas probe, which is arranged on an exhaust gas bank, a sensor for sensing an operational roughness of the internal combustion engine, a fault memory, and a program controlled computer unit, wherein the computer unit is operable to determine the uneven distribution of the fuel-air mixture individually for each cylinder as a function of the operating mode, and upon exceeding of a predetermined limit value the computer unit is further operable to make a fault entry in the fault memory, and upon unsuccessful correction of the cylinder concerned, the device is operable to limit the fuel supply to the cylinder concerned to a maximum or minimum value.

According to a further embodiment, the exhaust gas probe may be operable to sense and output a lambda value of the exhaust gas in homogenous mode of the internal combustion engine. According to a further embodiment, the internal combustion engine may comprise a rotational speed sensor for the crankshaft and the rotational speed sensor is operable to sense the segment time and to output a corresponding value with stratified operation of the internal combustion engine.

BRIEF DESCRIPTION OF THE DRAWINGS

An exemplary embodiment is shown in the drawing and will be explained in more detail in the following description.

FIG. 1 shows a block diagram with an internal combustion engine operating in homogenous mode, FIG. 2 shows a block diagram of an internal combustion engine operating in stratified mode, FIG. 3 shows a first flow diagram and FIG. 4 shows a second flow diagram.

DETAILED DESCRIPTION

With the method and the device for the diagnosis of the uneven distribution of a fuel-air mixture fed to the individual cylinders of an internal combustion engine according to various embodiments the advantage is obtained that the uneven distribution of the fuel-air mixture is individually determined for each cylinder of the internal combustion engine. It is therefore considered particularly advantageous that the determination of the uneven distribution is conducted as a function of the current operating mode of the internal combustion engine. While doing so, the λ-value of the exhaust gas for example is sensed as a function of the operating mode and used for evaluating the uneven distribution.

Alternatively, with a second operating mode, a lack of smoothness in the operation of the internal combustion engine is detected and a corresponding value individually determined for the individual cylinder there from. The determined values are compared with a predetermined limit value. Upon exceeding of the predetermined limit value a corresponding fault message is entered and stored in a fault memory of the motor vehicle for the cylinder concerned. This produces the special advantage that not only the faulty cylinder can be detected but also the actual cause that prompted the fault entry. For example a defective injection valve can be very easily determined in this manner if the fault for example was detected upon exceeding of the predetermined limit value for the exhaust gas emission.

It is considered advantageous that the λ-value of the exhaust gas is determined with homogenous operation of the internal combustion engine. With the λ-value it can be easily determined if for example the injection valve of the cylinder concerned is operating within the predetermined tolerances.

A further advantageous alternative solution can be seen in that with an internal combustion engine operating in stratified mode the lack of operational smoothness is analyzed. To determine the lack of operational smoothness the segment time on a crankshaft is measured and suitably evaluated. In this manner it can be very easily determined if for example the air supply to the cylinder concerned is within the predetermined tolerance limits.

If exceeding of the predetermined limit value has been determined during the individual analyses it is proposed according to various embodiments that the fuel quantity to be injected for the cylinder concerned is corrected so that with a subsequent injection the predetermined limit value is again maintained. A very simple closed control circuit with a self-healing effect is obtained in this manner.

A further aspect consists in that with repeated and unsuccessful correction of the cylinder concerned a visual and/or acoustic fault message is output. In this manner the driver of the vehicle can be informed of the current fault on his internal combustion engine. The specialist workshop additionally receives reliable information on the current fault so that it can directly deduce the cause of the fault in an advantageous manner and thus easily rectify the fault.

Furthermore it is provided that with repeated and unsuccessful correction of the cylinder concerned the fuel supply to that cylinder is limited to a maximum or minimum value. In this way it is prevented that for example a drastic deterioration of the exhaust gas emissions can occur and the environment is unnecessarily polluted.

The device according to an embodiment has the advantage that with homogenous operation of the internal combustion engine an exhaust gas probe (lambda probe) which is present on the vehicle anyway individually analyzes the exhaust gas for each cylinder and outputs a corresponding emission value to a suitable control device. Since today's vehicles are already equipped with an exhaust gas probe the measurement data of these can likewise be used according to various embodiments in an advantageous manner.

With a stratified operation of the internal combustion engine the segment time for each cylinder is determined and output. The segment time is determined in a very simple manner using a rotational speed counter. For example this can be a Hall sensor.

To optimize the fuel consumption and the exhaust gas emissions more preferably two operating modes are employed today with an internal combustion engine equipped with an injection system. In the operating mode "homogenous operation" the fuel is injected in the combustion chamber of a cylinder with an Otto-cycle engine operated with direct fuel injection so that complete mixing-through is obtained. This operating state is more preferably set with a high load demand.

The operating mode "stratified operation" is however achieved when the fuel is injected into the combustion chamber so that a stratification of the fuel-air mixture is obtained. The aim of this is that the air layer enriched with fuel is formed in the vicinity of the ignition electrode. This mode is aimed at more preferably at low load, at idle and in coasting mode.

Since the fuel injectors in part have large manufacturing tolerances and additionally depend on the ageing of the mechanical parts, more preferably that of a piezoelectric actuator, major uneven distribution in the fuel-air ratio is partly obtained over the individual cylinders. Dependent on the current engine operating mode, various compensation methods are employed for compensation. In homogenous engine mode for example an equalization function CILC (Cylinder Individual Lambda Control) is employed. This equalization function is based on measurement values of an exhaust gas probe (lambda probe).

In the case of an internal combustion engine operating in stratified mode however an equalization function CYBL (Cylinder Balancing via Engine Roughness) is employed. With the help of the mentioned function the engine roughness of the internal combustion engine is checked. Deviations are learnt, compensated and stored in a control unit. In the case of major uneven distribution and omission of compensation through a suitable function this would lead to a major emission deterioration and even a noticeable loss of driving comfort.

It is therefore provided according to an embodiment that upon exceeding of the predetermined limit values the fuel quantity to be injected is corrected so that with a subsequent injection the predetermined limit value is maintained. If this is not the case a visual and/or acoustic fault message is raised. With unsuccessful correction attempts it is suggested to limit the fuel supply to the cylinder concerned to a maximum or minimum value.

FIG. 1 shows a block diagram of a device according to an embodiment with which a diagnosis for the uneven distribution of the fuel-air mixture over the individual cylinders of an internal combustion engine can be carried out. FIG. 1 shows schematically an internal combustion engine 1 which is embodied with four cylinders 2. The internal combustion engine 1 is embodied with a direct injection of the fuel. The number of the cylinders 2 is not substantial for any embodiment. The number of cylinders can be any and depends on the design of the internal combustion engine 1.

In the exemplary embodiment an Otto-cycle engine is preferentially used which can be operated with gasoline or gas. The internal combustion engine 1 is equipped with an injection system wherein a separate fuel injector (injection valve) is provided for each cylinder. As a result the fuel quantity to be injected can be metered for each cylinder 1 individually depending on activation of the corresponding fuel injector. The air supply for forming the fuel-air mixture is effected via an intake tract (not shown in FIG. 1) which can be controlled with the help of a throttle flap depending on the load demand.

The individual cylinders 2 of the internal combustion engine 1 are connected with an exhaust gas bank 16 on the exhaust gas side so that with opened exhaust valve of the individual cylinders 2 the combusted fuel-air mixture can be discharged as exhaust gas. According to the exemplary embodiment four cylinders 2 are directed to an exhaust gas bank 16. In the exhaust gas bank 16 a catalytic converter 5 (exhaust gas catalytic converter) is additionally arranged via which the exhaust gas (shown as arrow in FIG. 1) is directed into a downstream exhaust gas pipe 6. The catalytic converter 5 is preferentially arranged near the engine.

As is further evident from FIG. 1 an exhaust gas probe 3 is additionally arranged in the exhaust gas bank 16 in front of the catalytic converter 5. The exhaust gas probe 3 is arranged so that it can sense the exhaust gas flow exhausted by the cylinders 2. In the process, the exhaust gas probe 3 measures the residual oxygen proportion present in the exhaust gas and supplies a corresponding lambda value ($\lambda$-value) to a program-controlled computer unit 15.

A program-controlled computer unit 15 comprises at least the following devices: a device 7 for capturing the cylinder-selective lambda deviations, a diagnostic device 8 for the diagnosis of the individual cylinder deviations and a fault memory 9.

The method, with which a more current lambda deviation can be selectively diagnosed for each cylinder 2 if the internal combustion engine 1 is in homogenous mode is described in the following by means of FIG. 1.

It is already known that the lambda value determined by the exhaust gas probe 3 corresponds to the exhaust gas which is directed from the individual cylinders 2 into the exhaust gas bank 16. For this exhaust gas flow a mean value is thus measured for the lambda value which with the global lambda control is usually used for controlling the fuel injection.

With the method according to an embodiment this global mean value formation of the lambda value is not sufficient however. It is rather proposed according to an embodiment that a lambda value or a cylinder-individual deviation to the predetermined limit value is selectively determined for each cylinder 2. This cylinder-individual deviation is then compared with a predetermined limit value. Upon exceeding of the predetermined limit value a defective fuel injector of the cylinder 2 concerned can then be detected as cause of the fault in a simple manner.

When determining the cylinder-selective lambda value or its deviation it is assumed that each cylinder 2 has an individual deviation which is known per se which deviates from the mean value to a lesser or greater degree. With the help of an algorithm (model) the deviation of the lambda value from the mean value is thus calculated for each cylinder 2. The following two adaptation methods are distinguished. With the open-loop method the previously determined deviations of the lambda value are analyzed in the diagnostic device 8 and compared with a predetermined limit value. If the limit value is exceeded, a cylinder-individual fault entry in the fault memory 9 occurs.

With a closed-loop control the previously determined deviations from the lambda mean value are compensated in the diagnostic device 8. The adaptation values obtained are then analyzed and compared with a corresponding adaptation limit value. On exceeding of the predetermined adaptation limit value a fault entry in the fault memory 9 is individually performed for each cylinder 2 if applicable. The predetermined limit value however is dependent on the current working point of the internal combustion engine 1. The charge differences however lie in a comparable order of magnitude across the entire family of characteristics so that this influence can be neglected in many cases.

In practice it has been shown that when measuring the lambda value and when determining the deviations or the adaptation values possible interference influences can develop through interference effects, signal noise etc. For this reason the signal is de-bounced in time and checked if the values after an applicable time, for example after approximately 30 seconds, are still defective. Only then will a fault entry in the fault memory 9 be made.

It is known that manufacturers of piezoelectric fuel injectors indicate a fluctuation of these fuel injectors due to the manufacture. This fluctuation due to the manufacture can be taken into account when predetermining the limit value so that a fault entry is only made when the predetermined limit or a corresponding adaptation value is exceeded.

FIG. 2 shows an exemplary embodiment wherein the internal combustion engine 1 operates in stratified mode. In this case it is not the exhaust gas of an exhaust gas probe that is used. A rotational speed sensor 10 is rather used which is embodied for example in form of a Hall sensor. The rotational speed sensor 10 is arranged in the region of a flywheel 4 of the internal combustion engine 1 which is mounted to a crankshaft and driven by the crankshaft. On the circumference of the flywheel 4 a multiplicity of teeth 4a is arranged which are scanned by the rotational speed sensor 10. The rotational speed sensor 10 in this manner senses a segment time which is measured on the rotating flywheel 4 between two adjacent teeth 4a. The segment time thus changes with the speed of the rotating flywheel 4.

If there is an uneven distribution of the fuel-air ratio supplied for the individual cylinders 2 of the internal combustion engine 1, the uneven distribution also brings about different segment times. The consequence is rough operation of the internal combustion engine 1 which becomes evident through vibrations and/or shaking if applicable. This operating roughness is thus sensed in a very simple manner with the help of the rotational speed sensor 10 when the engine is in stratified mode.

Similar to the previous description to FIG. 1, the segment times determined by the rotational speed sensor 10 are transferred to a device 11 of the computer unit 15. The device 11 can thus selectively calculate the operational roughness caused by the individual cylinders 2 by way of the segment time. Here the time span between each two adjacent teeth 4a of the flywheel 4 is measured and compared with subsequent segment times. If the individual segment times depending on the crankshaft position correspond with the predetermined values or lie within predetermined limit values the engine runs smoothly and there is no operational roughness. If however deviating segment times occur a corresponding operational roughness is present. Since the segment times are influenced by the ignition of the fuel-air mixture in the individual cylinders and the cylinders are ignited one after the other according to a predetermined pattern a defective cylinder can be detected with the help of a simple comparison.

For example the signal is scanned after each segment and a mean value for the cylinders of the engine is formed. The values of the cylinders are compared with the mean value and a deviation from the mean value is captured. Interference effects, signal noise etc. are faded out and the signal de-bounced. The diagnosis takes place in the diagnostic device 8. Only when following repeated measurements it is determined that the operational roughness continues to be above the predetermined limit value will a corresponding fault entry in the fault memory 9 for the cylinder concerned be made.

The determination of the operational roughness is applied in the open or in the closed-loop mode. In this case an adaptation function is created or adapted for the operational roughness. The rest of the method takes place similar to the method stated in FIG. 1.

FIGS. 3 and 4 each show a flow diagram for an exemplary embodiment. With the flow diagram of FIG. 3 the internal combustion engine is in a homogenous mode. The program starts in position 20 and checks in position 21 if homogenous mode is present. If this is not the case, it is assumed in position 22 that stratified mode is present. This sequence is explained in more detail later on in FIG. 4.

If however a homogenous mode was detected in position 21 it is then queried in position 23 if in the event of a closed-loop control and lambda-based control (CILC, Cylinder Individual lambda Control) is present or if an adaptation with an adaptation function is to be carried out. If this is the case the CILC adaptation values are compared with the predetermined limit value in position 24. If with an individual cylinder exceeding of the predetermined limit value is present a corresponding fault entry is made in position 25 for the cylinder concerned.

If however no closed-loop control was detected in position 23 but an open-loop control, the program jumps to position 26 and checks if the CILC monitoring quantities or the lambda values measured by the exhaust gas probe have exceeded the predetermined limit value. If this is the case, a corresponding fault entry is made for the cylinder concerned in position 27. In the other case the program jumps back to position 20 so that a new program start is started.

FIG. 4 shows a flow diagram for a further exemplary embodiment wherein the engine is in stratified engine mode. Once it was determined in position 22 according to FIG. 3 that stratified mode is present, the program starts in position 30 of FIG. 4 and checks in position 31 if the operational roughness-based equalization function CYBL_ER control (Cylinder Balancing via Engine Roughness) is applied or if in the closed-loop method the adaptation function is in operation. If this is the case, it is queried in position 33 if the CYBL_ER adaptation values have exceeded the predetermined limit value. If this is the case, a corresponding fault entry is made in position 34 for the cylinder concerned.

If it was determined in position 31 however that no closed-loop control or no adaptation function is in operation, the program jumps to position 32 and checks if the CYBL_ER measuring quantities, i.e. if the segment times have exceeded the predetermined tolerance limit values. If this is the case, a corresponding fault entry is again made in position 35 for the cylinder concerned.

In a further embodiment it is provided that with the cylinder individual storage of the fault entry, not only the cylinder concerned but also operating modes and controls of the internal combustion engine such as open-loop, closed-loop, CILC, CYBL_ER and the associated measurement values or adaptation values are stored. As a result, the actual cause of the fault and the location of the fault can be very easily deduced for example in the specialist workshop.

What is claimed is:

1. A method for the diagnosis of the uneven distribution of a fuel-air mixture fed to the individual cylinders of an internal combustion engine comprising a plurality of cylinders, the method comprising the steps of:

supplying the air via a throttle flap and the fuel for each cylinder via an injection valve and wherein following the combustion of the fuel-air mixture, sensing a lambda value of the created exhaust gas, wherein the uneven distribution for each cylinder is individually determined depending on the operating mode of the internal combustion engine by determining a lambda value or an operational roughness of the internal combustion engine, the values individually determined for the individual cylinders are compared with a limit value predetermined for the internal combustion engine and upon exceeding of the predetermined limit value for the cylinder concerned a fault entry is made in a fault memory, that upon exceeding of the predetermined limit value the fuel quantity to be injected for the cylinder concerned is corrected so that the predetermined limit value is maintained with a subsequent injection, with unsuccessful correction of the cylinder concerned the fuel supply to the cylinder concerned is limited to a maximum or a minimum value.

2. The method according to claim 1, wherein with an internal combustion engine operating in homogenous mode a lambda value is determined and output.

3. The method according to claim 1, wherein with an internal combustion engine operating in stratified mode the operational roughness of the internal combustion engine is analyzed and a corresponding value is output.

4. The method according to claim 3, wherein the operational roughness is determined through measurement of a segment time on a crankshaft of the internal combustion engine.

5. The method according to claim 1, wherein with repeated unsuccessful correction of the cylinder concerned at least one of a visual and acoustic fault message is output.

6. A device for diagnosing the uneven distribution of a fuel-air mixture with an internal combustion engine comprising a throttle flap which is arranged in an intake tract, a controllable injection valve, an exhaust gas probe, which is arranged on an exhaust gas bank, a sensor for sensing an operational roughness of the internal combustion engine, a fault memory, and a program controlled computer unit, wherein the computer unit is operable to determine the uneven distribution of the fuel-air mixture individually for each cylinder as a function of the operating mode, and upon exceeding of a predetermined limit value the computer unit is further operable to make a fault entry in the fault memory, and upon unsuccessful correction of the cylinder concerned, the device is operable to limit the fuel supply to the cylinder concerned to a maximum or minimum value.

7. The device according to claim 6, wherein the exhaust gas probe is operable to sense and output a lambda value of the exhaust gas in homogenous mode of the internal combustion engine.

8. The device according to claim 6, wherein the internal combustion engine comprises a rotational speed sensor for the crankshaft and the rotational speed sensor is operable to sense the segment time and to output a corresponding value with stratified operation of the internal combustion engine.

9. The device according to claim 8, wherein the rotational speed counter is a Hall sensor.

10. The method according to claim 4, wherein the segment time is determined using a Hall sensor.

11. An arrangement for the diagnosis of the uneven distribution of a fuel-air mixture fed to the individual cylinders of an internal combustion engine embodied with a plurality of cylinders, comprising:

a throttle flap for supplying air,
an injection valve for supplying fuel for each cylinder,
a lambda sensor for sensing a lambda value of a created exhaust gas following the combustion of the fuel-air mixture,
means for determining the uneven distribution for each cylinder individually depending on the operating mode of the internal combustion engine by determining a lambda value or an operational roughness of the internal combustion engine,
means for comparing the values individually determined for the individual cylinders with a limit value predetermined for the internal combustion engine, and
means for making a fault entry in a fault memory upon exceeding of the predetermined limit value for the cylinder concerned,
means for correcting the fuel quantity to be injected for the cylinder concerned, upon exceeding of the predetermined limit value, so that the predetermined limit value is maintained with a subsequent injection, and
means for limiting the fuel supply to the cylinder concerned to a maximum or a minimum value with unsuccessful correction of the cylinder concerned.

12. The arrangement according to claim 11, further comprising means for determining and outputting a lambda value with an internal combustion engine operating in homogenous mode.

13. The arrangement according to claim 11, with an internal combustion engine operating in stratified mode, the arrangement further comprising means for analyzing the operational roughness of the internal combustion engine and outputting a corresponding value.

14. The arrangement according to claim 13, further comprising means for determining the operational roughness through measurement of a segment time on a crankshaft of the internal combustion engine.

15. The arrangement according to claim 11, further comprising means for outputting at least one of a visual and acoustic fault message with repeated unsuccessful correction of the cylinder concerned.

16. The arrangement according to claim 14, comprising a Hall sensor for determining the segment time.

* * * * *